UNITED STATES PATENT OFFICE.

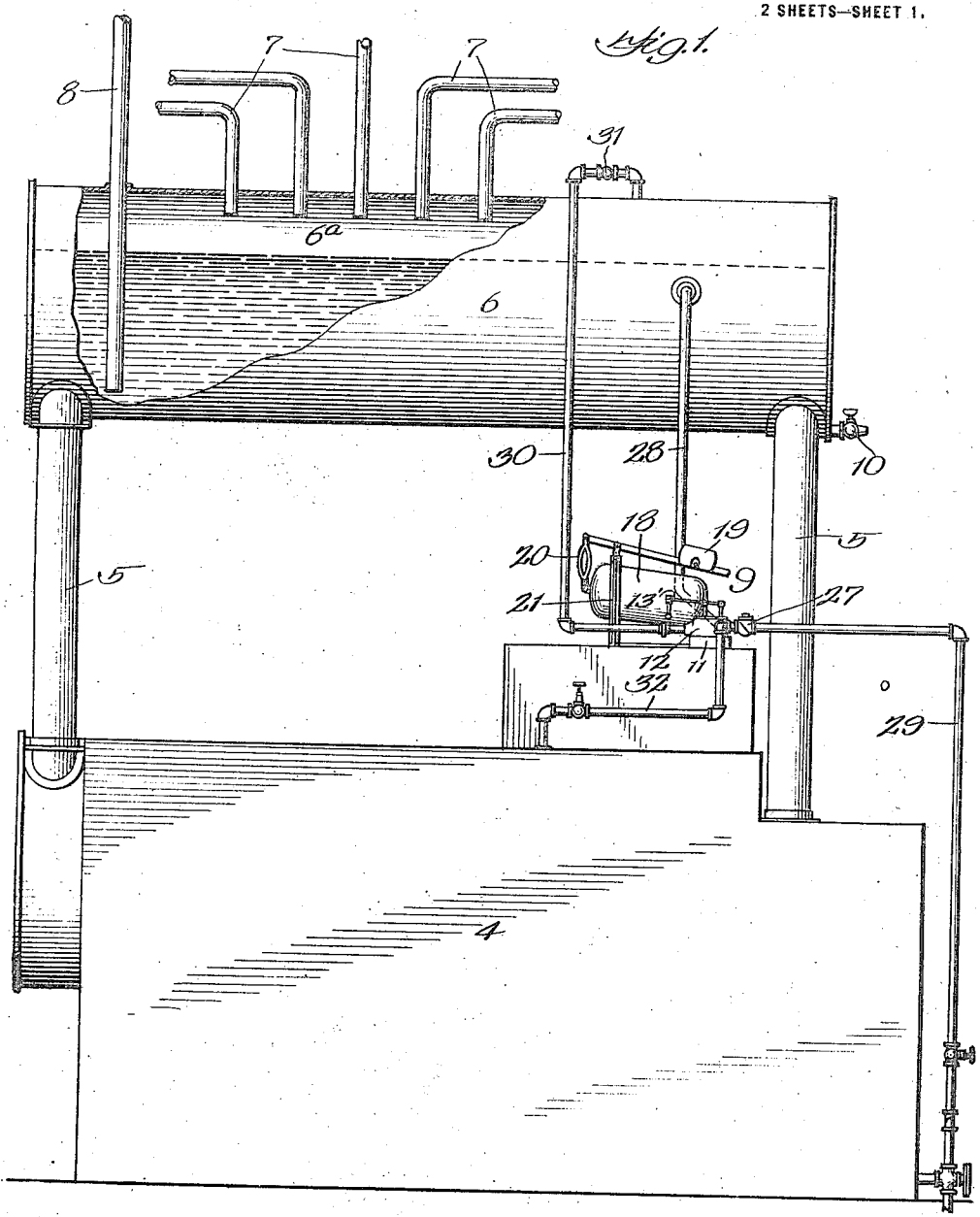

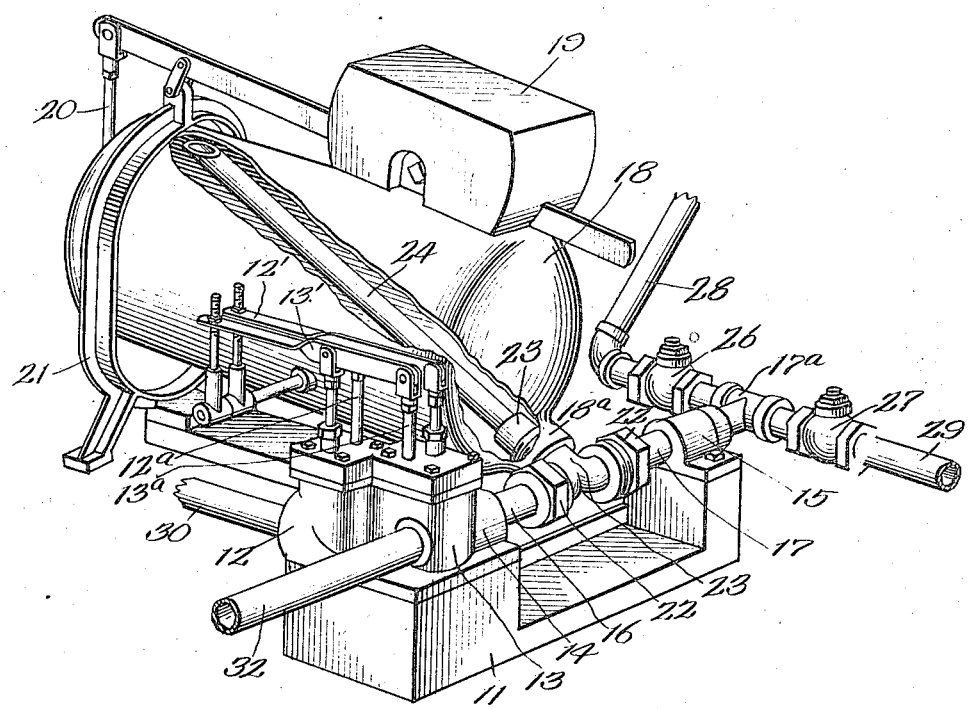
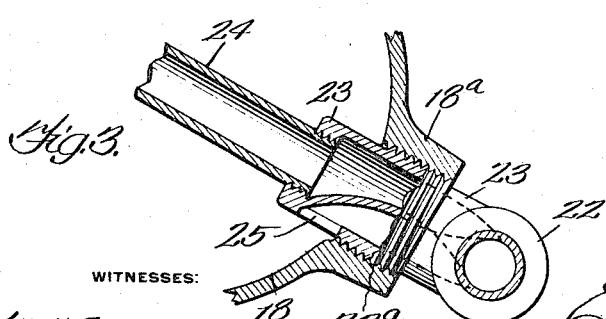

EDMUND BURKE, OF CHICAGO, ILLINOIS, ASSIGNOR TO CRANE COMPANY, OF CHICAGO, ILLINOIS, A CORPORATION OF ILLINOIS.

FEED-WATER APPARATUS.

1,242,917.  Specification of Letters Patent.  Patented Oct. 16, 1917.

Application filed September 19, 1916. Serial No. 120,932.

*To all whom it may concern:*

Be it known that I, EDMUND BURKE, a citizen of the United States, residing at Chicago, in the county of Cook and State of Illinois, have invented certain new and useful Improvements in Feed-Water Apparatus, of which the following is a specification.

My invention has reference to feed water apparatus wherein feed water is passed from a receiver or feed water supply tank to a boiler through the medium of a steam trap, or like device; and has for one of its principal objects to improve the construction and increase the efficiency and utility of apparatus of this character. The invention contemplates the provision of a steam venting pipe leading from the trap to the feed water supply tank for venting steam thereinto at a point above the normal water line of said tank, with the following objects in view. First, to permit the absorption of heat from the vented steam by the water in the tank and thereby raise its temperature before the discharge of the water to the boiler occurs; this heating of the feed water being especially advantageous in such cases where make-up water is delivered to the tank in addition to condensate. And, second, to equalize the pressure between the tank and trap and thereby insure a ready flow of feed water from the former to the latter subsequent upon the discharging action of the trap. A still further object is to provide a supply conducting pipe intermediate the tank and trap, the upper or inlet end of which is suitably connected with the tank at a point just below its normal water line and in such a manner that that portion only of the water heated by the vented steam flows through the pipe to the trap, and at the same time eliminating any possibility of sediment and scale being carried along with it.

These, together with such other objects as may hereinafter appear, or are incident to my invention, I attain by means of the construction illustrated in preferred form in the accompanying drawings, wherein:—

Figure 1 represents a front elevation of my improved apparatus, the upper portion of the receiving tank being broken away to afford a view of the interior arrangement;

Fig. 2 is a view in perspective of the type of trap preferably forming part of said apparatus; and Fig. 3 is an enlarged detail in section of the T portion of the trap trunnion.

Referring to the drawings, the numeral 4 designates a conventional type of boiler, and mounted in any suitable or convenient manner above it, as by the supporting columns 5, is a water supply tank or receiver 6, which, in the present instance, receives a supply of condensate through the drip pipes 7 and make-up cold water by means of the inlet pipe 8 whose lower end extends downwardly into the tank to a point just short of its bottom. The numeral 9 in Fig. 1 indicates a direct return steam trap positioned intermediately of the tank and boiler and operating through its connections therewith to first receive a supply of feed water from the tank and then discharge the same into a boiler. A blow-off valve 10 may desirably be employed with the tank to permit the ejection of such sediment and scale as may accumulate in the bottom of the tank.

Any return trap or similar device may of course be employed, and in this connection a brief description only is here given of the trap illustrated in the drawings, inasmuch as the details of its construction are fully set forth in Letters Patent #1,114,141 of October 20, 1914, to which reference may desirably be made.

The trap, as shown, occupies the position when empty or in process of being filled, and comprises a base 11 provided with the connected valve casings 12 and 13 and the boxes 14 and 15, in which are trunnioned the outer ends of the pipes 16 and 17, both valve casings alternately communicating through the pipe 16 with the tank 18 as the latter tilts on its axis. The numeral 19 indicates the customary counterbalance weight pivotally connected with the tank by the rod 20 and fulcrumed on the strap 21 which may be connected with the base 11 in any suitable maner. Secured to the inner ends of the trunnion pipes 16 and 17 by coupling members 22 is a T 23 whose inner portion has a threaded engagement at 23ª with the neck 18ª of the tank and projects therethrough to receive the steam conducting pipe 24, which latter communicates with the pipe 16. This inner portion is also formed with a water conducting opening 25 leading from the pipe 17 to the interior of the tank, said pipe terminating in a branch 17ª provided with the check valves 26 and 27.

The numeral 28 designates the water supply pipe for the trap, which pipe has its lower end associated with the check valve 26 and its upper or inlet end connected with the receiving tank 6 at a point well above the tank bottom and adjacently below the normal water line of said tank; 29 is a discharge pipe connected with the valve 27 and leading from the trap to the water space of the boiler; 30 indicates a steam venting pipe provided with a check valve 31 and extending from the outlet side of the valve casing 12 to conduct steam vented from the trap to the upper portion or steam space $6^a$ of the tank 6; and 32 designates a live steam inlet pipe having its upper end connected with the inlet side of the valve casing 13 and leading to the steam space of the boiler 4.

The valves in the casings 12 and 13 receive alternate actuation on the tilting of the tank by means of the valve stems $12^a$ and $13^a$, respectively, which are operated by the levers 12′ and 13′ suitably fulcrumed and connected with the tank, so that when the tank is filled and drops the vent line 30 is closed and the steam inlet is opened and the live steam entering the tank through the pipe 24 drives the accumulated water out of the tank via the T opening 25, pipe 17, and thence through the discharge pipe 29 into the boiler.

Tilting of the tank 18 in the opposite direction opens the vent line 30 and provides an avenue for the venting of the steam in the trap to what I have called the steam space $6^a$ of the receiving tank 6, thereby equalizing the pressure between the tanks and operating to produce a ready flow of water from the receiving tank 6 through the interior of the trap tank, this flow being materially aided as the pressure momentarily diminishing in the tank closes the valve 31 and effects an overbalancing of pressure in the steam space of the receiving tank 6.

Furthermore, it will be apparent that with the trap actuating to vent a supply of steam to the steam space $6^a$ of the receiving tank, the upper layer or portion of the feed water coming into contact with the steam absorbs heat from it, and it is this heated water, or layer of water, that is conducted to the trap interior for discharge to the boiler by the pipe 28 whose upper end, as I have already indicated, is carried well up to the water line of this receiving tank. The condensate entering the inlet pipes 7 has a temperature approximating that of the feed water in contact with the vent steam, and in the event that this condensate supply is not sufficient to maintain the normal water level of the receiving tank and colder make-up water is relied upon as an additional source of feed water, it will be obvious that this colder water in entering at the bottom of the tank will in gradually rising become heated before being fed to the trap through the water supply pipe 28. In carrying up the inlet end of this pipe to a point adjacent the water level in the receiving tank, a further advantage is attained in that no sediment or scale can possibly be carried down with the feed water into the trap.

From the foregoing description, the essential features, elements and operation of my improved apparatus, together with its simplicity and other advantages thereof, will be clearly apparent to those skilled in the art. I do not intend to restrict myself to the exact details of construction or to the precise arrangement of the various parts, as it is manifest that variations and modifications may be made in the features of construction and arrangement without departing from the spirit and scope of my invention. I therefore reserve the right to all such variations and modifications as properly fall within the scope of my invention and the terms of the following claims.

What I claim is:—

1. In a boiler feed apparatus, the combination with a boiler; of a self-contained feed water supply container having an inclosed upper pressure retaining chamber; a valved steam trap adapted to receive a supply of water from said container and having a steam space connected with the steam space of the boiler, whereby to effect a discharge of the water from the trap to the water space of the boiler; and a pressure controlling means for said container comprising a steam conducting vent pipe leading from the steam space of the trap to the pressure chamber of the container, and a check valve in said pipe adapted to automatically close when the pressure in the steam space of the trap is below that in the pressure chamber of the container.

2. In a boiler feed apparatus, the combination of a boiler; a self-contained feed water receptacle having an upper inclosed portion adapted to constitute a pressure retaining and water heating chamber for the feed water therein; a steam trap embodying a tilting tank provided with steam and water conducting connections with said boiler and said receptacle; one of said steam conducting connections leading from the tank interior to the pressure chamber of the said receptacle; and valvular means for said connections, part of said means actuable by the tilting of the tank and the other part pressure actuated; substantially as and for the purposes set forth.

In testimony whereof I have hereunto set my hand to this specification.

EDMUND BURKE.